US012686444B2

(12) United States Patent
Herrmann et al.

(10) Patent No.: US 12,686,444 B2
(45) Date of Patent: Jul. 21, 2026

(54) ADJUSTABLE LATERAL AIR-DIRECTING WING ARRANGEMENT FOR A MOTOR VEHICLE

(71) Applicant: Dr. Ing. h.c. F. Porsche Aktiengesellschaft, Stuttgart (DE)

(72) Inventors: Bernd Herrmann, Ehningen (DE); Joachim Paul, Benningen a.N. (DE); Okan Gönüldinc, Ostfildern (DE); Moritz Zeh, Stuttgart (DE); Dominik Beierl, Korntal-Münchingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 325 days.

(21) Appl. No.: 18/617,707

(22) Filed: Mar. 27, 2024

(65) Prior Publication Data

US 2024/0343314 A1      Oct. 17, 2024

(30) Foreign Application Priority Data

Apr. 12, 2023   (DE) .......................... 102023109181.6

(51) Int. Cl.
B62D 35/00          (2006.01)

(52) U.S. Cl.
CPC .................................. B62D 35/00 (2013.01)

(58) Field of Classification Search
CPC ...... B62D 35/00; B62D 35/007; B62D 37/02; Y02T 10/28
See application file for complete search history.

(56) References Cited

FOREIGN PATENT DOCUMENTS

| DE | 102014104157 A1 * | 10/2015 | ............. B62D 37/02 |
| DE | 102016206531 A1 | 11/2016 | |
| DE | 102019114702 A1 | 1/2020 | |
| DE | 102021118408 B3 | 8/2022 | |
| DE | 102013021767 B4 * | 2/2023 | ........... B62D 35/007 |

OTHER PUBLICATIONS

DE 102016100626 B4 (Year: 2020).*

* cited by examiner

*Primary Examiner* — Lori Lyjak
(74) *Attorney, Agent, or Firm* — Buchanan Ingersoll & Rooney PC

(57) ABSTRACT

An adjustable lateral air-directing wing arrangement for a motor vehicle includes a lateral air-directing wing, which is displaceable by an electric motor between a resting position retracted into a vehicle body and an active position extended from the vehicle body. The arrangement includes a vehicle-mounted carriage guide including a longitudinal guide track oriented predominantly in the motor vehicle longitudinal direction, and a guide carriage, which is linearly guided in the longitudinal guide track of the carriage guide and which supports the air-directing wing. The guide carriage includes a gear rack that is parallel to the movement of the guide carriage, and an electric motor-driven carriage drive, which includes an output gear cog that engages with the gear rack.

9 Claims, 3 Drawing Sheets

ADJUSTABLE LATERAL AIR-DIRECTING WING ARRANGEMENT FOR A MOTOR VEHICLE

CROSS-REFERENCE TO RELATED APPLICATION

This application claims priority to German Patent Application No. 10 2023 109 181.6, filed Apr. 12, 2023, the content of such application being incorporated by reference herein in its entirety.

FIELD OF THE INVENTION

The invention relates to an adjustable lateral air-directing wing arrangement for a motor vehicle comprising an adjustable lateral air-directing wing that is displaceable between a retracted resting position and an extended active position by means of an electric motor.

BACKGROUND OF THE INVENTION

Lateral air-directing wings are preferably used in the lateral regions of motor vehicles, in particular passenger cars, in order to improve lateral stall at higher speeds. In the present context, an air-directing wing in the aerodynamic sense can be a spoiler or a wing, around both sides of which air flows.

A typical displaceable lateral air-directing wing arrangement for a motor vehicle is known from DE 10 2019 114 702 A1, which is incorporated by reference herein, in which the lateral air-directing wing is designed to be outwardly pivotable. A lateral air-directing wing that is displaceable in the vehicle longitudinal direction is known from DE 10 2016 206 531 A1 which is incorporated by reference herein.

Known from DE 10 2021 118 408 B3, which is incorporated by reference herein, is an air-directing wing arrangement comprising a multi-lever kinematic arrangement for performing a movement for the air-directing wing between a rest position and an active position in both a motor vehicle longitudinal direction rearwards and a motor vehicle lateral direction outwards. This kinematic arrangement has a complex design. In the active position of the air-directing wing, the kinematic arrangement is exposed to water, snow, and dirt from the outside.

SUMMARY OF THE INVENTION

The lateral air-directing wing arrangement for a motor vehicle according to aspects of the invention comprises a lateral air-directing wing, which is also referred to as a sideblade and is displaceable by means of an electric motor between a resting position retracted into a motor vehicle body and an active position extended out of the motor vehicle body. Particularly preferably, a respective lateral air-directing wing arrangement for a motor vehicle according to aspects of the invention is provided in a mirror-symmetrical manner with respect to each other both on the right side and on the left side of the motor vehicle. In its retracted resting position, the air-directing wing is at least partially retracted into the vehicle body. In its extended active position, at least the majority of the longitudinal extent of the air-directing wing is in any case also fully extended out of the vehicle body.

The air-directing wing arrangement comprises a vehicle-mounted carriage guide having a longitudinal linear guide track oriented predominantly in the motor vehicle longitudinal direction. Two parallel carriage guides or longitudinal guide tracks are preferably provided to improve the guiding characteristics. A guide carriage, which supports or holds the air-directing wing, is guided in the longitudinal guide track of the carriage guide in a largely linear manner. The guide carriage thus performs a substantially linear and substantially longitudinal motion between the resting position and the active position in a horizontal plane. The movement component in the longitudinal direction is in this case always greater than the movement component in the transverse direction.

The guide carriage comprises a gear rack arranged parallel to the movement of the guide carriage. Further provided is an electric motor-driven and vehicle-mounted carriage drive, which comprises an output gear cog that engages in a meshing manner with the gear rack such that, by way of the carriage drive comprising an electric drive motor, the guide carriage is able to move along the longitudinal guide track of the carriage guide between the two extreme positions. In this way, with a simple and inexpensive construction, a kinematics for the air conduction blade is provided.

It is preferably provided that the guide carriage comprises two separate gear racks, which are parallel to one another and each of which engages with a separate output gear cog, whereby the two output gear cogs are driven in a synchronous manner by the drive motor of the carriage drive. Particularly preferably, one gear rack is arranged at the upper end of the guide carriage, and the other gear rack is arranged at the lower end of the guide carriage. As a result, any tilting of the guide carriage during the movement, or rather the displacement, with respect to the vehicle-mounted carriage guide is practically ruled out.

It is preferably provided that the gear rack is designed to be integral with the guide carriage. The guide carriage can, e.g., be a plastic injection molded part that forms both the functional portion of the guide carriage as well as the gear rack or racks. The central kinematic component is economically provided in this manner.

The guide carriage itself preferably comprises at least one transverse carriage track, the orientation of which comprises a significant component in the motor vehicle transverse direction, and through which a wing support is guided, thus directly supporting the air-directing wing. Whereas the movement of the air-directing wing in the longitudinal direction is substantially defined by the carriage guides mounted on the vehicle body, the movement of the air-directing wing in the transverse direction is substantially defined by the transverse carriage track of the guide carriage. Overlapping double guidance is achieved in this manner.

It is preferably provided that a transverse movement of the air-directing wing is only performed at the end of the longitudinal movement defined by the carriage guide in the direction of the active position. In this way, the air-directing wing is initially substantially extended out of the body in the longitudinal direction and is only subsequently moved in the transverse direction. Preferably, it can be provided for this purpose that the longitudinal guide track and the carriage track are designed such that the transverse carriage track is released only in the extended active position of the guide carriage. Given that the air-directing wing is preferably moved longitudinally in its own base plane, only a relatively small, gap-like vertical vehicle body opening is required for the air-directing wing to pass through, on the path between its retracted resting position and its extended active position.

The vehicle body preferably comprises a vehicle body opening, which opens in a substantially vertical and rearward direction, and through which the air-directing wing travels between its resting position and its active position. It is particularly preferably provided that a rear end of the air-directing wing largely fills or closes the vehicle body opening in the resting position of the air-directing wing. As a result, the entire kinematic apparatus within the vehicle body is relatively well protected from water, dirt, or snow from entering from the outside, in particular in the resting position of the air-directing wing.

BRIEF DESCRIPTION OF THE DRAWINGS

An example embodiment of the invention is explained in further detail hereinafter with reference to the drawings.

DETAILED DESCRIPTION OF THE INVENTION

Figure 1:
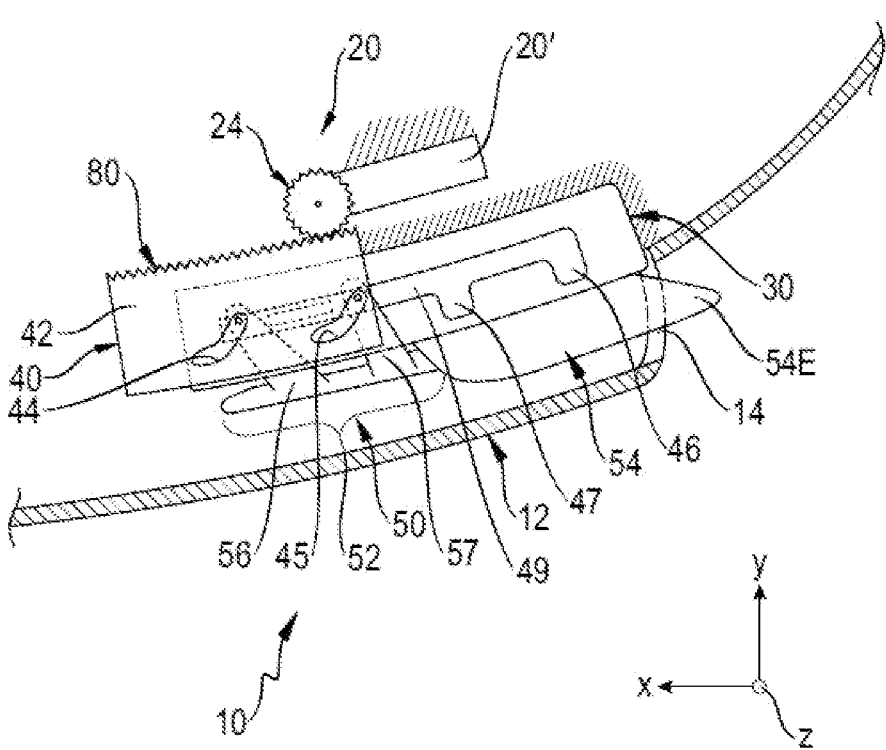
FIG. 1 is a horizontal plane as seen from above of an adjustable lateral air-directing wing arrangement for a motor vehicle with an air directing wing in its resting position retracted into the vehicle body.
Figure 2:
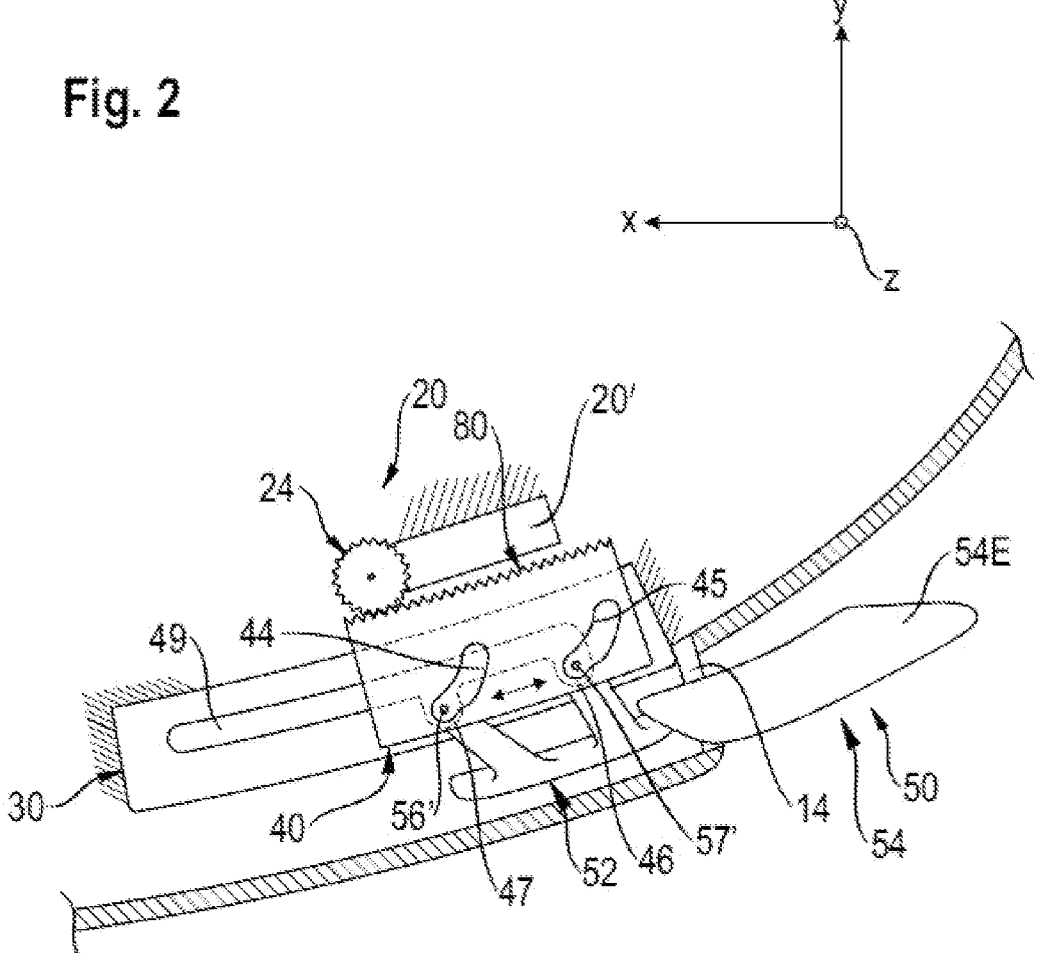
FIG. 2 shows the lateral air-directing wing arrangement for a motor vehicle of FIG. 1 with the air-directing wing extended to its active position.

The drawings show an adjustable lateral air-directing wing arrangement for a motor vehicle 10, which comprises a lateral air-directing wing 54, which is displaceable by means of an electric motor between a resting position retracted into the motor vehicle body 12 (shown in FIG. 1) and an active position extended out of the vehicle body 12 (shown in FIG. 2). FIGS. 1 and 2 show a horizontal plane xy of a left rear motor vehicle region as seen from above. The spatial directions indicated in the drawings are the motor vehicle longitudinal direction x, the motor vehicle transverse direction y, and the motor vehicle vertical direction z.

The air-directing wing arrangement 10 comprises two vehicle-mounted carriage guides 30, both of which are arranged in a horizontal plane xz, are mirror symmetrical with respect to each other, and are at a vertical distance from each other. The drawings show only the upper carriage guide 30.

Further provided is electric motor-driven vehicle-mounted carriage drive 20 which comprises an electric drive motor 20'.

The vehicle body 12 shown in this case is substantially comprised of a vertical body wall having a slot-like vehicle body opening 14 substantially in a vertical transverse plane, through which the air-directing wing 54 passes between its retracted rest position and its extended active position.

Each carriage guide 30 comprises a longitudinal guide track 49, in which a guide carriage 40 and the guide block thereof 41 is positively guided predominantly in the longitudinal motor vehicle direction x. The carriage guide 30 further comprises two short transverse guide tracks 46, 47, but these are not used to guide the guide carriage 40, which is only guided in a longitudinal direction.

Figure 3:
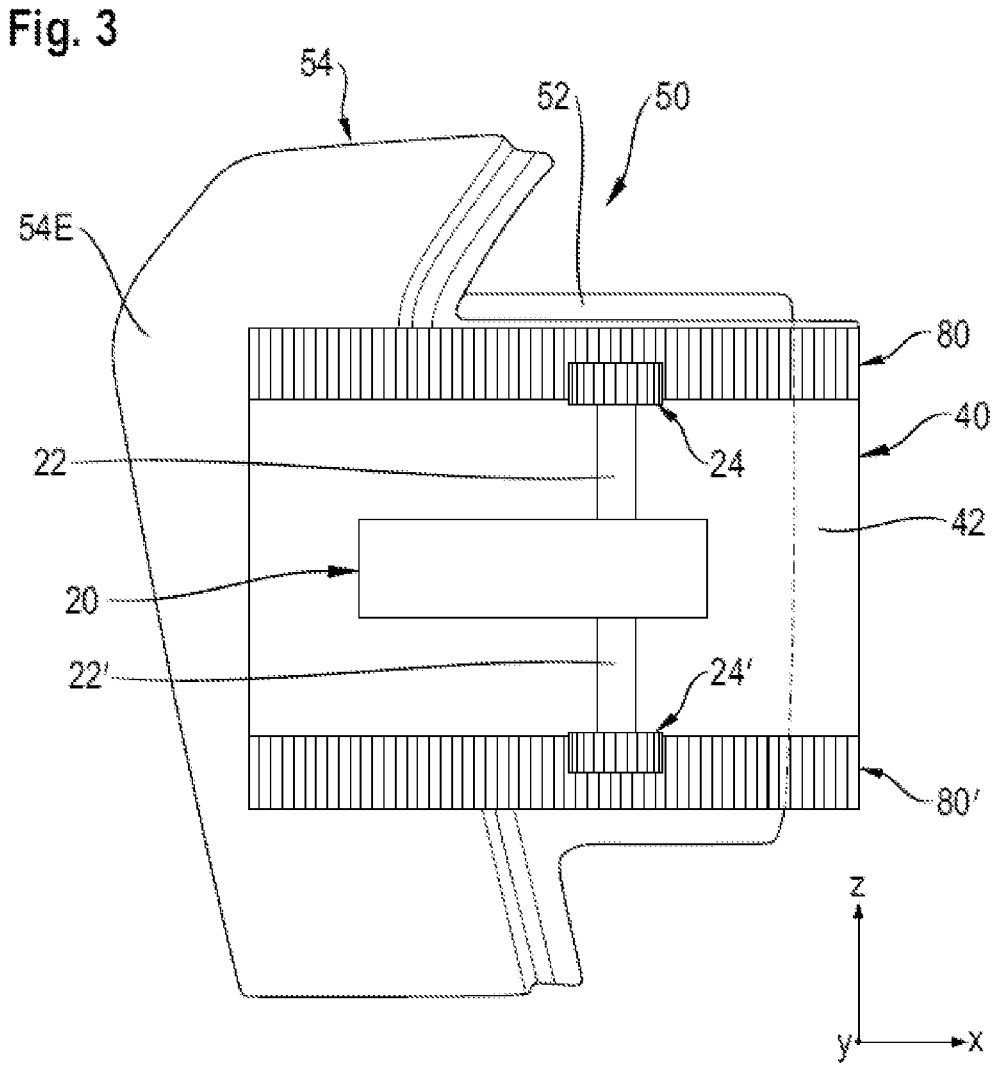
FIG. 3 is a side view of the arrangement of FIGS. 1 and 2 from the inside, including the air-directing wing.

On the interior side facing the center of the vehicle, the guide carriage 40 comprises an upper gear rack 80 and a lower gear rack 80', as shown in FIG. 3. Each gear rack 80, 80' lies in a respective horizontal plane. The upper gear rack 80 and the upper carriage guide 30 lie in approximately the same horizontal plane, and the lower gear rack 80' and the lower carriage guide lie in approximately the same horizontal plane.

The guide carriage 40 comprise two transverse carriage tracks 44, 45, in which a guide pin 56', 57' of a wing support 52 is guided, in turn. The two transverse carriage tracks 44, 45 each lie in a same horizontal plane and are not oriented in the transverse direction y, but are oriented with an inclined orientation between the transverse direction y and the longitudinal direction x. The two guide pins 56', 57' of the wing support 52 also protrude vertically into the longitudinal guide track 49 and into the transverse guide tracks 46, 47. The guide carriage 40 is formed from an integral plastic molded guide carriage body 42.

The wing support 52 comprises two support arms 56, 57, each comprising one of the two guide pins 56', 57' and both integrally connected to and supporting the air-directing wing 54. The wing support 52 and the air-directing wing 54 consist of an integral plastic wing body 50.

The carriage drive 20 comprises a vehicle-mounted electric drive motor 20', which is arranged in a vertically central manner and drives an output gear cog 24, 24' in a rotary and synchronous manner via two respective vertical output gear cogs 22, 22'. The upper output gear cog 24 engages with the upper gear rack 80, and the lower output gear cog 24' engages with the lower gear rack 80' such that the guide carriage 40 is guided and driven in a tilt-free manner, and no jamming of the guide carriage 40 can occur in the carriage guide 30.

Referring to FIGS. 1 and 2, upon rotation of the two output gears 24, 24', clockwise of the guide carriage 40 and the air-directing wing 54 are moved to the rest position shown in FIG. 1, and upon rotation of the output gears 24, 24' are moved to the active position shown in FIG. 2 in a counter-clockwise direction.

During the final phase of movement to the active position shown in FIG. 2, the two guide pins 56', 57' and with them the air-directing wing 54 are forced outwardly through the two transverse carriage tracks 44, 45 to move in the transverse direction y. Conversely, at the start of the transfer from the active position shown in FIG. 2 back to the resting position shown in FIG. 1, the two guide pins 56', 57' and with them the air-directing wing 54 are moved inwardly through the two transverse carriage tracks 44, 45 in cooperation with the two transverse guide tracks 46, 47 in the transverse direction y before the longitudinal movement of the guide carriage 40, defined by the longitudinal guide tracks 49, begins.

As can be seen in the schematic FIG. 1, the vehicle body opening 14 is filled in and enclosed to a large extent by the rear end 54E of the air-directing wing 54 in the resting position of the air-directing wing 54 so that only a narrow circumferential gap remains. In the active position shown in FIG. 2, the air-directing wing 54 also largely fills the vehicle body opening 14. In this way, the sensitive part of the guidance arrangement within the vehicle body 12 is always well shielded and protected from water, snow, and dirt from the outside.

What is claimed is:

1. An adjustable lateral air-directing wing arrangement for a motor vehicle comprising:
   a lateral air-directing wing which is displaceable by way of an electric motor between a resting position retracted into a vehicle body and an active position extended from the vehicle body,
   a vehicle-mounted carriage guide comprising a longitudinal guide track oriented predominantly in a motor vehicle longitudinal direction,
   a guide carriage, which is linearly guided in the longitudinal guide track of the carriage guide and which supports the air-directing wing, wherein the guide carriage comprises a gear rack that extends parallel to the movement of the guide carriage, and an electric motor-driven carriage drive, which comprises an output gear cog that engages with the gear rack.

2. The adjustable lateral air-directing wing arrangement for a motor vehicle according to claim 1, wherein the guide carriage comprises two separate, parallel gear racks, each of which engages with a separate output gear cog, wherein both output gear cogs are driven in a synchronous manner by a drive motor of the carriage drive.

3. The adjustable lateral air-directing wing arrangement for a motor vehicle according to claim 2, wherein the one gear rack is arranged at the upper end of the guide carriage, and the other gear rack is arranged at the lower end of the guide carriage.

4. The adjustable lateral air-directing wing arrangement for a motor vehicle according to claim 1, wherein the gear rack is integrated with the guide carriage.

5. The adjustable lateral air-directing wing arrangement for a motor vehicle according to claim 1, wherein the guide carriage comprises at least one transverse carriage track, which comprises a component in a motor vehicle transverse direction and in which a wing support that supports the air-directing wing is guided.

6. The adjustable lateral air-directing wing arrangement for a motor vehicle according to claim 5, wherein the longitudinal guide track and the carriage track are configured such that the transverse carriage track is released only in the active position of the guide carriage.

7. The adjustable lateral air-directing wing arrangement for a motor vehicle according to claim 1, wherein the vehicle body comprises a vehicle body opening, which opens in a substantially vertical and rearward direction, and through which the air-directing wing travels between the resting position and the active position.

8. The adjustable lateral air-directing wing arrangement for a motor vehicle according to claim 7, wherein a rear end of the air-directing wing fills the vehicle body opening in the resting position of the air-directing wing.

9. A motor vehicle comprising the adjustable lateral air-directing wing arrangement of claim 1.

* * * * *